United States Patent
Majnemer et al.

(10) Patent No.: US 11,500,959 B2
(45) Date of Patent: Nov. 15, 2022

(54) MULTIPLE OUTPUT FUSION FOR OPERATIONS PERFORMED IN A MULTI-DIMENSIONAL ARRAY OF PROCESSING UNITS

(71) Applicant: Google LLC, Mountain View, CA (US)

(72) Inventors: David Alexander Majnemer, Mountain View, CA (US); Blake Alan Hechtman, Mountain View, CA (US)

(73) Assignee: Google LLC, Mountain View, CA (US)

(*) Notice: Subject to any disclaimer, the term of this patent is extended or adjusted under 35 U.S.C. 154(b) by 622 days.

(21) Appl. No.: 16/543,282

(22) Filed: Aug. 16, 2019

(65) Prior Publication Data
US 2021/0049231 A1   Feb. 18, 2021

(51) Int. Cl.
G06F 17/16 (2006.01)
G06F 9/30 (2018.01)
G06F 9/38 (2018.01)
G06F 9/455 (2018.01)
G06F 9/50 (2006.01)
G06F 13/28 (2006.01)

(52) U.S. Cl.
CPC ......... *G06F 17/16* (2013.01); *G06F 9/30043* (2013.01); *G06F 9/3897* (2013.01); *G06F 9/45516* (2013.01); *G06F 9/5016* (2013.01); *G06F 13/28* (2013.01)

(58) Field of Classification Search
CPC .... G06F 17/16; G06F 9/3897; G06F 9/30043; G06F 9/45516; G06F 13/28; G06F 9/5016; G06F 8/4441
USPC .......................................................... 708/520
See application file for complete search history.

(56) References Cited

U.S. PATENT DOCUMENTS

2007/0294512 A1    12/2007  Crutchfield et al.
2007/0294665 A1*   12/2007  Papakipos ................. G06F 8/45
                                                            717/119

OTHER PUBLICATIONS

Boehm et al., "On Optimizing Operator Fusion Plans for Large-Scale Machine Learning in SystemML" arXiv, Jan. 2018, 14 pages.
(Continued)

*Primary Examiner* — Tan V Mai
(74) *Attorney, Agent, or Firm* — Fish & Richardson P.C.

(57) ABSTRACT

Methods, systems, and apparatus, including instructions encoded on storage media, for performing reduction of gradient vectors and similarly structured data that are generated in parallel, for example, on nodes organized in a mesh or torus topology defined by connections in at least two dimension between the nodes. The methods provide parallel computation and communication between nodes in the topology.

20 Claims, 8 Drawing Sheets

(56) References Cited

OTHER PUBLICATIONS

PCT International Search Report and Written Opinion in International Application No. PCT/US2020/046092, dated Nov. 26, 2020, 16 pages.
Wikipedia.com [online], "Matrix multiplication" May 2019, retrieved on Nov. 12, 2020, retrieved from: URL <https://en.wikipedia.org/w/index.php?title=Matrixmultiplication&oldid=897619589>, 14 pages.
Wikipedia.com [online], "Optimizing compiler" Aug. 2019, retrieved on Nov. 11, 2020, retrieved from: URL <https://en.wikipedia.org/w/index.php?title=Optimizingcompiler&oldid=910093762>, 14 pages.
Kuck et al. "Dependence graphs and compiler optimizations," Proceedings of the 8th ACM SIGPLAN-SIGACT , Jan. 1981, 207-218.
International Preliminary Report on Patentability in International Appln. No. PCT/US2020/046092, dated Mar. 3, 2022, 9 pages.

\* cited by examiner

MULTIPLE OUTPUT FUSION FOR OPERATIONS PERFORMED IN A MULTI-DIMENSIONAL ARRAY OF PROCESSING UNITS

BACKGROUND

Multiple computer processing units can be combined into an array of processing units for parallel processing of data. In some cases, the configuration of the array of processing units can be optimized for performing particular operations. In other cases, the array of processing units can be a generic configuration for completing any operation.

SUMMARY

This specification describes technologies relating to processing of datasets in general, and specifically to parallel processing, pipeline processing, and multiprocessing datasets in multi-dimensional arrays of processing units. When configuring instructions for executing (e.g., processing) data on a multi-dimensional array of processing units, a compiler can configure the instructions to optimize the processing of the instructions for the particular configuration of the processing units of the array. For example, the compiler can configure an operation, which may include reuse of portions of the data for repetitive calculations, to store results for those calculations and reuse the results as needed, rather than performing the repetitive calculation. An operation can include a computing step of an algorithm, such as an addition step. In some implementations, an operation includes a sequence of steps, such as a multiplication operation. For example, in a convolution computation, data (e.g., a tensor) of a first data set is multiplied with data of a second data set. Generally, perform this multiplication, intermediate values can be generated which are then summed into a final result. For multiplying tensors without optimization, some of the intermediate values are repeatedly calculated to be included in the final sum. The compiler is configured to recognize this repetition and fuse (e.g., combine) the repetitive operations of the calculation into a single operation. In this example, the compiler recognizes that the intermediate result can be computed once. The intermediate result can be stored and referenced repeatedly as needed to complete the convolution computation. The compiler thus modifies the calculation to fuse the repetitive operations of the operation and store the result in a location that is described in a specification of the multi-dimensional array of processing units. In another example, the compiler combines operations to reduce memory bandwidth usage and keep intermediate values of calculations in on-chip registers. This results in more efficient processing of the operation because the amount of data that is loaded and extracted from the multi-dimensional array of processing units is reduced.

Generally, the processing units are networked together in a two-dimensional (2D) array. In some implementations, the 2D array can include a systolic array. The multi-dimensional array of processing units can include a distributed memory, with each cell of the multi-dimensional array of processing units including a cache or other storage. The cells of the multi-dimensional array of processing units are also connected to each other in a particular way, such as in a torus configuration, a mesh configuration, or other multi-dimensional configuration. The compiler receives a specification indicating the hardware configuration of the multi-dimensional array of processing units. The specification includes the details of how the processing units are connected (e.g., which units are connected to which other units), how much storage is associated with each unit (if any), and so forth. The compiler can fuse operations to take advantage of the multi-dimensional hardware configuration, reducing data transfers between nodes and the number of computations performed by one or more of the processing units. This can be referred to as multiple output fusion (MOF) in multiple dimensions.

Fusing the operations results provides several computing advantages. The processing time for executing an instruction is reduced for a given multi-dimensional array of processing units. This is because fewer computations are needed to execute the same functionality when the instructions are optimized. Some computations are combined. In some implementations, the instructions are modified to execute on the hardware at a faster rate, such as using parallel loops in the hardware (e.g., torus loops), which can parallelize and/or pipeline execution of the instructions as supported by that particular hardware.

Another advantage includes that a number of data transfers between processing units is reduced. The compiler can alter the instructions to reduce the number of times that processing units need to perform direct memory accesses, which consume limited memory bandwidth and which can be processing bottlenecks.

Another advantage is that the number of operations performed by the multi-dimensional array of processing units is reduced. This is because repetitive operations (e.g., operations that generate the same intermediate result) can be combined together into a single operation. In this case, the intermediate result is stored and referenced as needed rather than being recomputed.

In an aspect, a compiler is configured to perform operations including receiving a specification indicating a configuration of matrix multiplication circuitry being implemented as a multi-dimensional array of processing units; receiving a set of operations for execution by the matrix multiplication circuitry; based on the specification, applying a cost model to the set of operations, the cost model indicating a change in a computing cost for fusing two or more operations of the set of operations by the matrix multiplication circuitry indicated by the specification; determining, based on the applying, that the computing cost is reduced by fusing at least two operations of the set of operations when the fused operations are executed by the matrix multiplication circuitry; fusing the at least two operations of the set of operations; and generating executable logic configured to sequence the fused operations into the matrix multiplication circuitry.

In some implementations, the specification indicates that each processing unit of the matrix multiplication circuitry comprises a cache configured to store at least a portion of a result of a fused operation and an arithmetic processing unit (ALU) configured to operate on the portion of the result. In some implementations, applying the cost model to the set of operations based on the specification comprises: identifying data that is to be processed repeatedly in the matrix multiplication circuitry as indicated by an operation of the set of operations to repeatedly generate a result; determining, from the specification, that the cache of a processing device is configured to store the result of a first iteration of the operation and that the processing device is configured to cause the result to be retrieved in the matrix multiplication circuitry for subsequent iterations of the operation; and generating an instruction causing the processing device to store the result of the operation in the cache and retrieve the stored result in the matrix multiplication circuitry. In some implementations, the specification includes dimensions of the matrix multiplication circuitry. In some implementations, the specification includes direct memory access (DMA) parameters for the matrix multiplication circuitry. In some implementations, an operation of the set of operations includes a convolution operation, and where fusing at least two operations comprises causing one or more processors of the matrix multiplication circuitry to latch data representing kernel values for the convolution operation.

In some implementations, fusing the operations comprises concatenation of two tensors by multi-dimensional broadcasting. Generally, each operation of the set of operations is represented as a graph in the cost model, the graph including one or more optimization pathways. In some implementations, generating executable logic comprises just-in-time compiling. In some implementations, the processing units of the matrix multiplication circuitry are arranged to form a systolic array.

In an aspect, one or more non-transitory computer readable media storing instructions that are executable by one or more processors are configured to perform operations including: receiving a specification indicating a configuration of matrix multiplication circuitry being implemented as a multi-dimensional array of processing units; receiving a set of operations for execution by the matrix multiplication circuitry; based on the specification, applying a cost model to the set of operations, the cost model indicating a change in a computing cost for fusing two or more operations of the set of operations by the matrix multiplication circuitry indicated by the specification; determining, based on the applying, that the computing cost is reduced by fusing at least two operations of the set of operations when the fused operations are executed by the matrix multiplication circuitry; fusing the at least two operations of the set of operations; and generating executable logic configured to sequence the fused operations into the matrix multiplication circuitry.

In some implementations, the specification indicates that each processing unit of the matrix multiplication circuitry comprises a cache configured to store at least a portion of a result of a fused operation and an arithmetic processing unit (ALU) configured to operate on the portion of the result.

In some implementations, applying the cost model to the set of operations based on the specification comprises: identifying data that is to be processed repeatedly in the matrix multiplication circuitry as indicated by an operation of the set of operations to repeatedly generate a result; determining, from the specification, that the cache of a processing device is configured to store the result of a first iteration of the operation and that the processing device is configured to cause the result to be retrieved in the matrix multiplication circuitry for subsequent iterations of the operation; and generating an instruction causing the processing device to store the result of the operation in the cache and retrieve the stored result in the matrix multiplication circuitry.

In some implementations, the specification includes dimensions of the matrix multiplication circuitry. In some implementations, the specification includes direct memory access (DMA) parameters for the matrix multiplication circuitry.

In some implementations, an operation of the set of operations includes a convolution operation, and where fusing at least two operations comprises causing one or more processors of the matrix multiplication circuitry to latch data representing kernel values for the convolution operation.

In some implementations, fusing the operations comprises concatenation of two tensors by multi-dimensional broadcasting. In some implementations, each operation of the set of operations is represented as a graph in the cost model, the graph including one or more optimization pathways. In some implementations, generating executable logic comprises just-in-time compiling. In some implementations, processing units of the matrix multiplication circuitry are arranged to form a systolic array.

The details of one or more embodiments of the process and system are set forth in the accompanying drawings which are given by way of illustration only, and the description below. Other features, aspects, and advantages of the invention will become apparent from the description, the drawings, and the claims. Like reference numbers and designations in the various drawings indicate like elements.

BRIEF DESCRIPTION OF THE DRAWINGS

Like reference numbers and designations in the various drawings indicate like elements.

DETAILED DESCRIPTION

Figure 1:
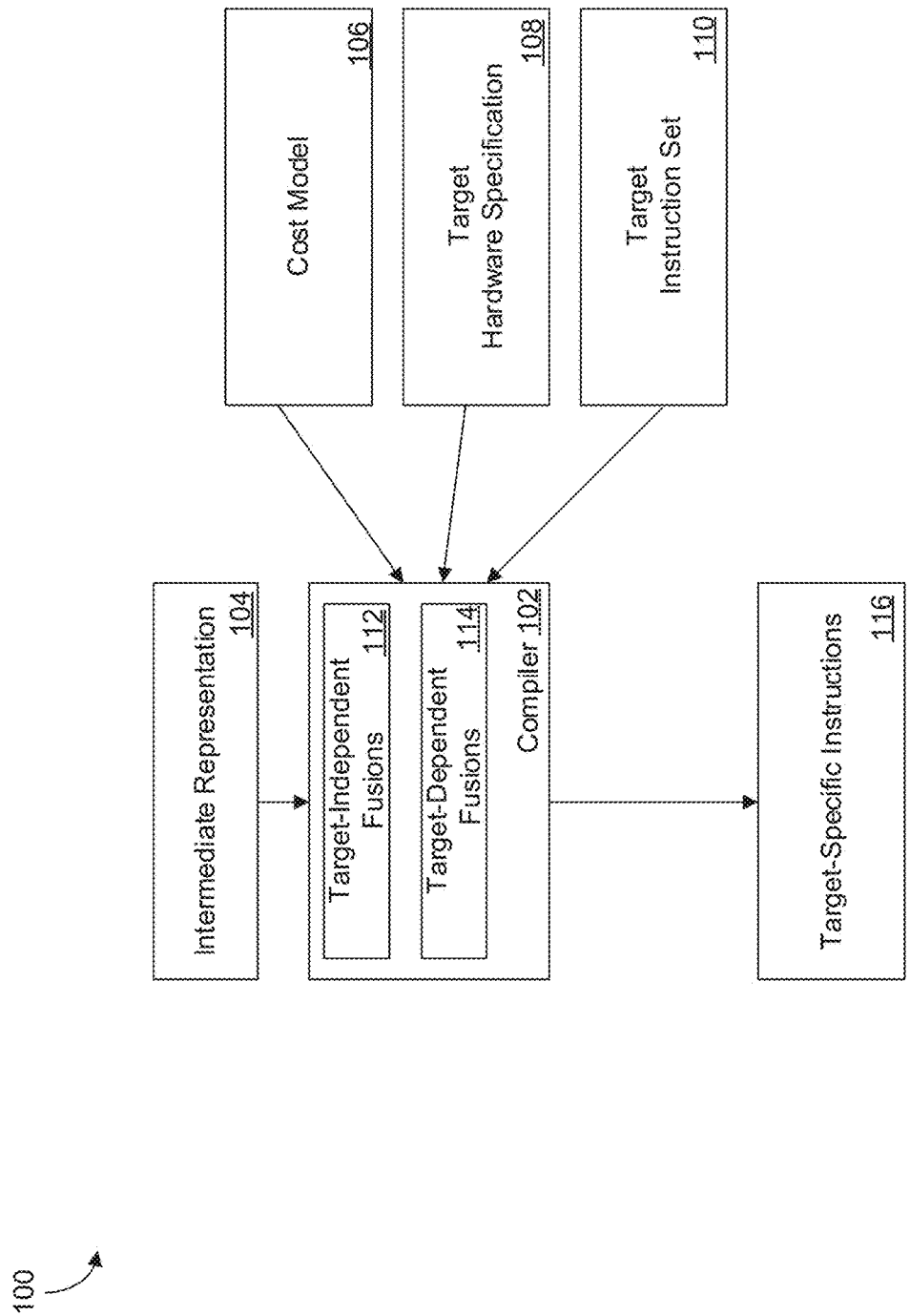
FIG. 1 shows an example of an environment for multiple output fusion for operations performed in a multi-dimensional array of processing units.

FIG. 1 shows an example of an environment 100 for multiple output fusion in a multi-dimensional array of processing units. In the environment 100, a compiler 102 is configured to receive an intermediate representation 104 of operations to be performed by a target, such as a multi-dimensional array of processing units (not shown). The compiler 102 is configured to optimize the operations of the intermediate representation by combining (e.g., fusing) two or more operations together. The compiler 102 generates executable machine code including target-specific instructions 116 that are executable by specified target hardware.

The compiler 102 generally comprises a software system. The compiler 102 is executed by a hardware system capable of receiving data, processing data, and generating output data. The compiler 102 is configured to determine which operations of the intermediate representation 104 to combine by analyzing several sources of data. The sources of data include a cost model 106, a hardware specification 108 of the target (also a target hardware specification 108), and a target instruction set 110. The compiler 102 is configured to consider each of target-independent fusions 112 and target-dependent fusions 114 of operations of the intermediate representation 104.

Once the compiler 102 has optimized execution of the operations of the intermediate representation 104 by combining two or more of the operations, the compiler 102 produces target-specific instructions. The target-specific instructions 116 are configured for execution by the target hardware to perform the operations specified in the intermediate representation 104. Each aspect of this process is subsequently described in further detail.

Generally, the intermediate representation 104 represents instructions for the processing of datasets. The intermediate representation 104 can include a data structure or code that can be compiled into machine instructions for the target by the compiler 102. The intermediate representation 104 represents a set of operations that each represent a processing action to be performed by the target, generally on other data. For example, the intermediate representation 104 can include an all-to-all operation, in which data from each processing unit of the multi-dimensional array of processing units (also called a core or node) is copied to each other processing unit of the multi-dimensional array of processing units. For example, the intermediate representation 104 can represent a cross replica sum operation, which computes a sum across each processing unit and in which the output shape of the data is the same as the input shape. For example, the operations can include concatenation of two values, matrix multiplication, global gather, global scatter (or global broadcast), convolution, transposition of a matrix, retrieving a matrix slice, and so forth. These operations are a representative number of operations, and this list is non-exhaustive. Generally, the operations represented in the intermediate representation 104 include a larger set of operations for performing on data elements, data vectors, and data matrices. The intermediate representation 104 can be a language representing operations that are specified by a computation graph, e.g., operations specified in a software framework that represents neural network computations as computation graphs.

The compiler 102 is configured to receive a set of operations that are included in the intermediate representation 104 and compile them into target-specific instructions 116 that are executable by the target architecture, as target-specific instructions 116. The target-specific instructions include executable code for a particular target. More specifically, the target-specific instructions 116 include details for the target (e.g., the multi-dimensional array of processing units) for accessing/reading data from memory, writing data to memory, the order and distribution of tasks among multiple processing units (if applicable) and how data are shared between the processing units, and so forth. For example, for processing a data matrix, the target-specific instructions include details as to which processing unit of the multi-dimensional array of processing units receives the data and in what order each vector of the matrix is processed. The intermediate representation 104 can be loaded into the compiler 102 at run time to determine how best to combine operations into the target-specific instructions 116. This ensures that optimizations are performed that use available hardware in the target. Thus, the compiler 102 can run as a just-in-time (JIT) compiler.

The target-specific instructions 116 are generated by the compiler 102 using a target instruction set 110. The target instruction set 110 is a library of operations that the target is configured to execute. The compiler 102 translates the intermediate representation 104 into a sequence of instructions that are each represented in the target instruction set 110. When performing compilation, the compiler 102 references the target instruction set 110 to determine operations that are supported by the target architecture. In addition, the compiler 102 is configured to determine which operations (and in what order) are more efficient at completing the operations represented in the intermediate representation 104 than others for the target architecture. In some implementations, it is possible to combine several operations of the intermediate representation 104 together.

The compiler 102 is configured to combine (e.g., fuse) multiple operations of the intermediate representation 104 together for any target hardware architecture of the specification 108 and for any application, but can be configured specifically for parallel processing, pipeline processing, and multiprocessing datasets in multi-dimensional arrays of processing units (e.g., systolic arrays). Examples of the multi-dimensional arrays of processing units are described subsequently in further detail. When configuring instructions for executing (e.g., processing) data on a multi-dimensional array of processing units, the compiler 102 can configure the instructions to optimize the processing of the instructions for the particular configuration of the processing units of the array. For example, the compiler 102 can configure an operation, which may include reuse of portions of the data for repetitive calculations (e.g., for convolution, matrix multiplication, etc.), to store results for those calculations and reuse the results as needed, rather than performing the repetitive calculation. As previously described, an operation can include a computing step of an algorithm, such as an addition step. In some implementations, an operation includes a sequence of steps, such as a multiplication operation. The compiler 102 references the specification 108, which includes a description of the multi-dimensional array of processing units that are for executing the operations. The compiler 102 determines which operations to combine to optimize the execution of the operations for the specific multi-dimensional array of processing units described in the specification 108. This can also be described as an accelerate-able model of a computation graph (e.g., a model that can be accelerated for computations of neural networks).

The compiler 102 is configured to combine operations based on the configuration of the multi-dimensional array of processing units configured to execute the operations. The compiler 102 combines the operations differently for different configurations of the array of processing units. For example, different configurations of the multi-dimensional array of processing units can include different sizes of the array, such as various numbers of processing units (e.g., cores or nodes) in each row and column of the array. In some implementations, different configurations of the array include different connections between processing units of the array, such as a mesh configuration, a torus configuration, a ring configuration, and so forth. In some implementations, different configurations of the array includes different data storage (e.g., memory, cache, etc.) associated with one or more processing units of the array. The storage can be distributed or centralized with respect to the processing units.

The compiler 102 performs fusions of operations of the intermediate representation 104 when the compiler compiles the intermediate representation into the target-specific instructions 116 (e.g., executable code). To determine whether fusions should be performed for a particular operation represented in the intermediate representation 104, the compiler 102 checks the status of the target hardware as described in the target hardware specification 108 and determines what portion of the target hardware (e.g., the multi-dimensional array of processing units, associated registers, associated memory, etc.) is required to execute the given operation. The compiler 102 also checks what hardware is required to execute other operations of the intermediate representation 104. In some implementations, operations may not use conflicting hardware, so the compiler 102 can cause the operations to be run in parallel. In some implementations, an operation can be run repeatedly on a same processing unit, and the intermediate results can be stored in a local memory (e.g., on chip memory), descreasing the number of memory accesses to complete the operation and reducing overall processing time.

For a given set of operations in the intermediate representation, the compiler reviews hardware details like the number of loads that would occur for the operations, a number of memory stores available, a number of processing units (e.g., arithmetic units of the processing units) that are available, a configuration of the array of processing units (including number, available interconnections, dimensions, and so forth), connections between hardware, a number of registers, and a memory capacity used by an operation. This list is representative and non-exhaustive—other features of the hardware can be included in this determination.

For a given set of operations, the compiler 102 determines whether fusion is feasible, and then whether fusion would actually increase optimization of the processing of the operations by the target hardware. The compiler 102 avoids fusion of operations if the compiler determines that it would be infeasible due to performance or correctness considerations to generate code for the set of operations which have been selected for fusion. For example, the compiler 102 avoids fusion of operations of the intermediate representation which would cause an excessive amount of memory consumption, such as memory consumption over a threshold percentage of total memory size or availability for a particular processing unit or for the array of processing units. This is because overconsumption of memory can cause a resulting program to run out of memory once it has been executed.

The compiler 102 determines which operations can be fused based on the logical content of the operations. Certain operations are logically combinable while some operations are not logically combinable. The compiler 102 can perform a logical analysis on the operations to determine which operations are logically combinable (e.g., which operations are suitable for parallelization, pipelining, etc.). Once fusable operations have been identified, the hardware status is subsequently checked to determine if the fusion is feasible on the target hardware. In some implementations, the specification 108 specifies which operations are combinable for the target hardware. The compiler 102 then checks the status of the hardware for determination of whether the combination is feasible.

The compiler 102 takes into account which hardware resources are available for execution of the operations of the intermediate representation 104. If hardware is available for executing the fused operations, then the fusion is determined to be feasible. In an example, four operations are included in the intermediate representation, including operations A, B, C and D. The compiler 102 determines that each of these operations can be fused with each other operation based on the logical content of the operations. In other words, independent of hardware capability, each of the operations is logically combinable, either by parallelization, pipelining, etc. The compiler 102 determines which hardware each operation would consume upon execution. For example, operations A and B would utilize hardware resource X. Operations C and D, meanwhile, would utilize hardware resource Y. The compiler 102 determines, without further information, to fuse A with C and B with D because this ensures that hardware resources X and Y are not oversubscribed. In another example, a third hardware resource Z may receive the data from resources X and Y. In this case, the compiler 102 would check to determine that the resource Z would not be oversubscribed by executing operations on X and Y in parallel each cycle. As subsequently described, a cost model 108 is used by the compiler 102 to determine if fusing A and C and B and D would be more efficient than, for example, fusing A with a different operation of the intermediate representation 104 (e.g., operation E). The compiler 102 compiles the fused operations into target-specific instructions 114 comprising executable code specifying that the fused operations be performed together in the multi-dimensional array of processing units.

In some implementations, the compiler 102 can import or generate a dependence graph representing the dependence of operations of the intermediate representation 104 on one another. The dependence graph specifies which operations that are performed depend on the results of other operations. The dependence graph can be updated by the compiler 102 to show where parallelization or pipelining may occur in the dependence graph in response to receiving the specification 108. For example, if the specification 108 shows that a number of matrix multipliers are available (such as the hardware shown in FIG. 3), the compiler 102 can partition a matrix multiplication among the available multipliers and parallelize the operation. The dependence graph can be updated as more operations are received in the intermediate representation 104 and in response to status changes for the multi-dimensional array of processing units (e.g., if additional hardware becomes available).

In an example of executing a matrix multiplication computation, the compiler 102 optimizes the process of matrix multiplication for a particular configuration of the multi-dimensional array of processing units as specified in the specification 108. The compiler 102 receives the specification detailing a size of the multi-dimensional array of processing units, how any memory associated with the multi-dimensional array of processing units is configured, how the processing units are connected to one another, and so forth. The compiler 102 can determine, for example, how large a portion of a first array can be stored for summing repeatedly with portions of the second array to reduce the computation time from exponential to sub-exponential. The size of the portion of the first array can be chosen to match the dimensions of the multi-dimensional array of processing units. This results in the compiler 102 combining the operations (such as the addition operations) in different ways depending on the size of the multi-dimensional array of processing units as specified in the specification 108. In this example, the first array can include an array of parameter values, and the second array can include an array of activation values. A subset of the activation values are stored in memory local to a processing unit and repeatedly summed by that processing unit with portions of the array of parameter values. Each processing unit can be assigned a different subset of the activation values, and their results can be broadcast to other processing units after parallel summing occurs.

In another example including a convolution computation, as the integral product is calculated, a portion of a first function is repeatedly multiplied with a portion of a second function. The compiler 102 is configured to recognize this repetition and combine (e.g., fuse) the repetitive operations of the calculation into a single operation. In this example, the result of the combined operation can be stored (e.g., cached) in storage that is in communication with one or more processing units of the multi-dimensional array. The result can be referenced repeatedly as needed to complete the convolution computation. The compiler 102 thus modifies the calculation to combine the repetitive operations of the operation and store the result in a location that is described in the specification 108.

Generally, the hardware architecture described by the specification 108 includes the multi-dimensional array of processing units. In some implementations, the processing units are networked together in a two-dimensional (2D) array. In some implementations, the 2D array can include a systolic array. The multi-dimensional array of processing units can include a distributed memory, with each cell of the multi-dimensional array of processing units including a cache or other storage. The cells of the multi-dimensional array of processing units are also connected to each other in a particular way, such as in a torus configuration, a mesh configuration, or other multi-dimensional configuration. The compiler receives a specification indicating the hardware configuration of the multi-dimensional array of processing units. The specification includes the details of how the processing units are connected (e.g., which units are connected to which other units), how much storage is associated with each unit (if any), and so forth. In some implementations, the multi-dimensional array comprises a three-dimensional (3D) array of processing units. The 3D array can include a stack of 2D layers that are each configured to communicate with adjacent layers of the stack. Each 2D layer can include a mesh of processing units, a ring of processing units, and so forth.

The compiler 102 can combine operations to take advantage of the hardware architecture represented by the specification 108, reducing data transfers between nodes and the number of computations performed by one or more of the processing units of the array. The specification 108 includes the details of how each processing unit of the multi-dimensional array of processing units is connected to other processing units and a description of the computing capabilities of each of the processing units. For example, the specification 108 can indicate a speed at which data can be read/written from a line, word sizes of the processing units, register size, an arithmetic logic unit (ALU) configuration, a processing speed, and so forth.

Target-dependent fusions 114 include combinations by the compiler 102 of operations of the intermediate representation 104 that are dependent on the particular hardware architecture of the specification 108. Generally, the target-dependent fusions 114 are available to the compiler 102 when the compiler 102 has the specification 108 of the hardware that is configured to execute the operations. The compiler 102 includes target-dependent fusions 114 in the target-specific instructions 116 when the target-dependent fusions cause the execution of the target-specific instructions to be further optimized in the target hardware (e.g., the multi-dimensional array of processing units). Optimization can include reducing latency in processing operations specified by the intermediate representation 104 by reducing a number of processing steps required to execute the operations, relative to a number of processing steps for executing the operations of the intermediate representation 104 without the target-dependent fusions. Optimization can include reducing latency in execution of an instruction set compiled from the intermediate representation 104 by reducing a number of direct memory access (DMA) requests needed to execute the instruction set. In some implementations, the compiler 102 is configured to introduce parallel loading of data into the processing units (if the hardware architecture is configured to do so) to further optimize execution of the instruction set. Parallel loading can be introduced for parallel processing or for pipelining the processing of data by the multi-dimensional array of processing units. The compiler 102 tests target-dependent fusions 116 against a cost model 106, as subsequently described, to determine whether to include each of the target-dependent fusions in the target-specific instructions 116.

The compiler can include target-independent fusions 112 in the target-specific instructions 116. The target-independent fusions 112 can be included in addition to or in the alternative to some of the target-dependent fusions 114. The target-independent fusions 112 are combinations of operations of the intermediate representation 104 that are able to be processed independent of the particular hardware architecture of the multi-dimensional array of processing units that are executing the instructions. For example, if the intermediate representation 104 specifies a sequence of operations to be performed by a processing unit, it can be possible to combine two or more of the operations of the intermediate representation 104 for execution by any processing unit, regardless of whether the processing unit is a part of a multi-dimensional array of processing units.

The compiler 102 also receives a cost model 106 for determining which target-independent fusions 112 and which target dependent fusions 114 to implement in the target-specific instructions 116. The compiler 102 checks the cost model 106 when a combination of operations of the intermediate representation 104 is possible. The cost model 106 can assign weights and/or costs to each combination or potential combination by the compiler 102. For example, the cost model 106 may specify that combining a first operation and a second operation provide a 1% lower cost to execution of the operations of the intermediate representation 104, relative to executing the operations without the combination.

The cost model 106 can represent various metrics of the processing of instructions by the multi-dimensional array of processing units. For example, a cost of the cost model 106 can represent an overall time of the execution. For example, a cost of the cost model 106 can represent a number of times that memory is accessed. For example, a cost of the cost model 106 can represent a number of processing cycles that occur to execute the instruction set by the multi-dimensional array of processing units. Other metrics are possible for representation of the execution of the instructions by the multi-dimensional array of processing units.

Generally, the cost model 106 is specific to the configuration of the target hardware (e.g., the multi-dimensional array of processing units). For example, combining a first operation and a second operation of the intermediate representation 104 can provide a benefit for a first configuration of the multi-dimensional array of processing units, but provide no benefit (or potentially a cost) for a second, different configuration of the multi-dimensional array of processing units. For example, when the processing units of the multi-dimensional array of processing units are in a torus configuration, it may be beneficial to cause parallel execution in each loop of the torus. However, if the processing units are in a mesh configuration that does not have torus loops, parallel execution on each row or column of the mesh can result in an increase in execution time or no benefit in execution time because of an increased time for broadcasting the results to the other processing units. In such a situation, the order in which processing units of the multi-dimensional array of processing units receive and process the data can be changed to retain the benefit of parallel processing. For example, if each processing unit in a mesh configuration has two processing nodes that are internally connected, torus loops can be simulated using the internal connections between nodes of processing units on the ends of the mesh. The target hardware specification 108 can specify the particulars of each of these configurations. As a result, the cost specified in the cost model 106 of loading the data in parallel to rows of the multi-dimensional array of processing units can be different for the different configurations of the multi-dimensional array of processing units.

In some implementations, because the target hardware is known, the cost model can include specific costs associated with each operation of the target instruction set 110 or for combinations of operations of the target instruction set. As stated previously, the cost can be stated in terms of consumption of a computing resource (such as memory access bandwidth), computing time (e.g., a number of computing cycles to execute an operation), or a combination of these. Generally, optimization refers to reducing a time to execute the operations, and so this can require balancing the consumption of different computing resources. For example, if operations are equally distributed among the multi-dimensional array of processing units but this causes saturation of a memory access bandwidth, the overall execution time can likely be further optimized. The available computing resources of the hardware (and how they are related to one another) are known to the cost model. The cost model represents how much of each computing resource is required for each operation and the cost of a fused or combined operation. For example, for a matrix multiplication operation for matrices of a given size, the cost model can determine how much time it would take for a single processing unit to compute the result. This time can be compared to another time for splitting the operation between two processing units and merging the results, which could be inefficient depending on the size of the matrices because of the additional overhead of splitting the matrices and combining the results. Another cost could be assigned to saving intermediate results of the multiplication, which adds additional steps of sending values to memory and accessing those values. This may be less efficient for small matrices but efficient for relatively large matrices, depending on the size of the multi-dimensional array of processing units, the speed of accessing the memory, the size of the memory, and so forth. A cost (e.g., a time) can be assigned to each option, and the lowest cost option selected. These costs can change if the operation is a part of a sequence of operations. For example, if the intermediate results are to be used in another computation after the matrix multiplication, then saving the intermediate results can save even more time.

Generally, the compiler 102 generates the target-specific instructions 116 that have the lowest cost indicated in the cost model 106 for the target hardware architecture of the specification 108. For example, the compiler 102 can receive an indication in the intermediate representation 104 of a matrix multiplication operation. The compiler 102 can determine whether to partition the matrix multiplication across several processing units or to execute the matrix multiplication on a single processing unit. For some configurations of the multi-dimensional array of processing units, local storage at each processing unit may not be available. In other examples, memory bandwidth for accessing intermediate results from off-chip storage may be scarce. The compiler 102 checks the cost model 106 to determine whether reducing a number of memory access during the computation saves more time than partitioning the matrix multiplication across several processing units. In another example, the time cost of communicating data between processing units may be higher than the benefit of parallel execution of matrix multiplication. The compiler 102 determines whether to cause the multi-dimensional array of processing units to partition the matrix multiplication across multiple processing units or whether to perform the matrix multiplication for the portions of the matrix in sequence on a single processing unit. The compiler 102 can determine whether intermediate results can be stored locally at the processing unit or whether the results are sent to off-chip memory. If the intermediate results can be stored locally, the compiler 102 can combine operations of computing the matrix multiplication across the partitions by causing the intermediate result to be stored locally at the processing unit and "washing" the result over the other portions of the matrix data.

The target-specific instructions 116 can be sent to target hardware for execution. For example, the target hardware including the multi-dimensional array of processing units can be a part of a graphical processing unit (GPU). The specification 108 can include a description of the GPU. The target-specific instructions 116 can be configured to run on a single GPU kernel, such as combining addition, multiplication, and reduction steps of a reduce_sum operation into the single operation. In this example, the "single" operation refers to a sequence of operations that are occurring but that are combined for execution by a single GPU kernel. In this example, intermediate values produced during the addition, multiplication, and reduction steps can be stored in GPU registers associated with the kernel while the computation is being performed. Reducing memory accesses off-chip reduces memory bandwidth usage, which can be a source of latency for processing these operations (e.g., the cause of a computation bottleneck). Reducing memory accessing operations thus reduces latency and improves processing performance of the GPU. However, how the operations are combined is dependent on what the processing capabilities are of the GPU, for example which processing resources are available for use and how they are connected. As stated previously, the intermediate representation 104 can be loaded into the compiler 102 at run time to determine how best to combine operations, the compiler 102 can run as JIT compiler. For example, the compiler 102 can receive bytecode representing tensor flow graphs. The compiler 102 can optimize those graphs (if possible) using target-independent fusions 112. The compiler 102 then checks the specification 102 and the cost model 108 to perform target-dependent fusions 114, which can depend on the state of the target hardware (e.g., the multi-dimensional array of processing units). The compiler 102 then generates target-specific instructions 116, which are optimized to run on the target hardware at the time the target hardware receives the instructions 116. The target hardware executes the target-specific instructions to perform an application, such as image processing, neural network computations, etc.

Figure 2:
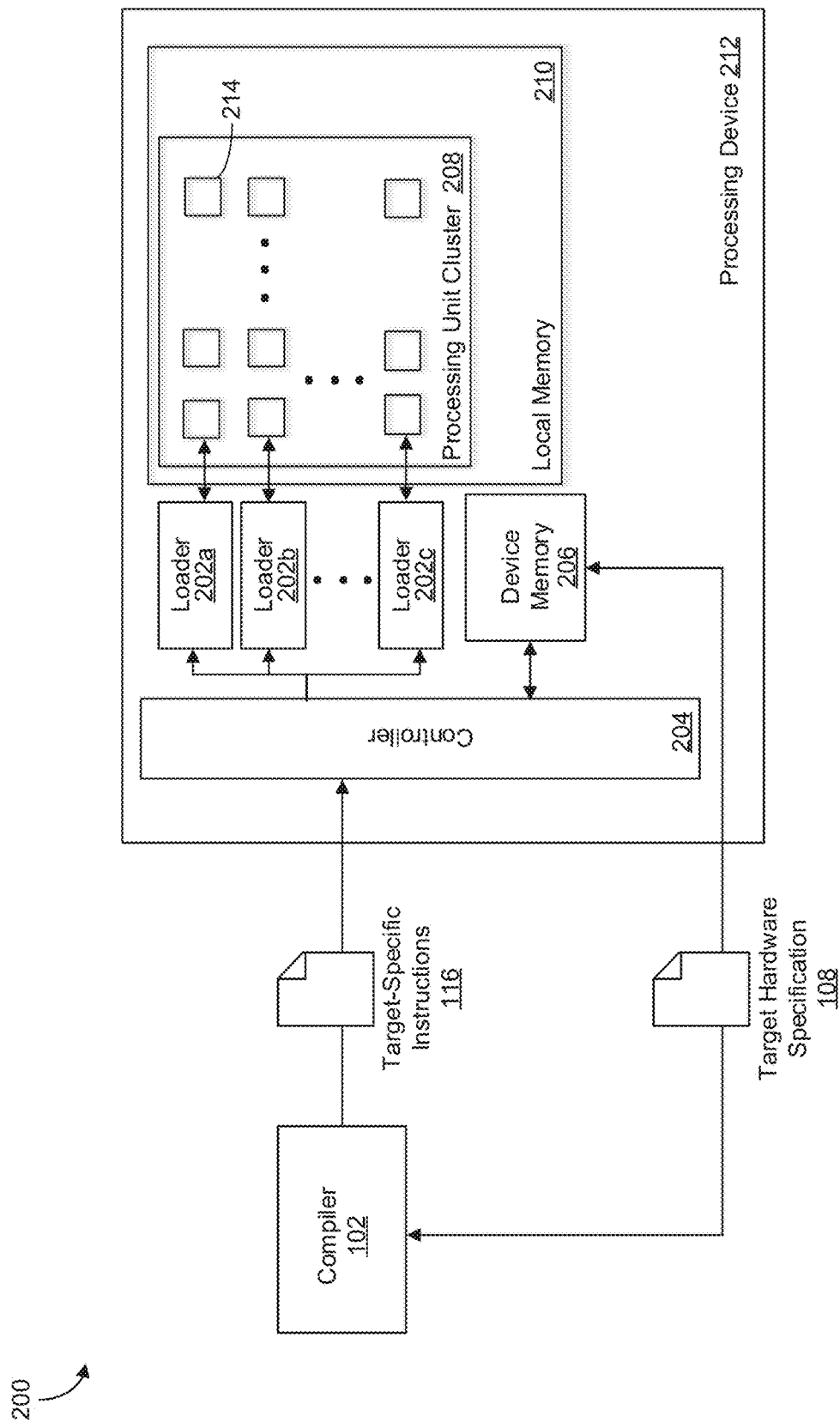
FIG. 2 shows an example architecture of a processing system for multiple output fusion in a multi-dimensional array of processing units.

FIG. 2 shows an example architecture of a processing system 200 for multiple output fusion in a multi-dimensional array of processing units. The processing system includes a processing device 212 and the compiler 102. In some implementations, the compiler 102 can be included with the processing device 102 on the same board, but the compiler 102 can also be included in a separate processing device that is in communication with the processing device 212. The target-specific instructions 116 are generated as described in relation to FIG. 1. The target-specific instructions 116 are configured to optimize performance by the particular processing device 212 that is executing the instructions.

The compiler 102 receives the specification 108 from the processing device 212. In some implementations, the specification 108 can be retrieved from the device memory 206. The specification 108 can be retrieved while the processing device 212 is executing other instructions. The specification 108 can include a representation of the hardware status of the processing device 212. More specifically, the specification 108 can include a representation of the configuration of the processing unit cluster 208, the local memory 210, and loaders 202a, 202b, and 202c, which can be registers (or some other hardware) configured to send data to the processing unit cluster 208. For example, the device memory 206 can store the instruction set that is available to the processing device 212. This instruction set that is supported by the processing device 212 can be provided to the compiler 102 in the specification.

The processing device 212 includes a controller 204. The controller 204 is configured to control loads for each of the loaders 202a, 202b, and 202c. In some implementations, this includes thread control. The controller 204 determines which processing units (e.g., including processing unit 214) of the processing unit cluster 208 receives data for processing as specified by the target-specific instructions 116. In other words, the controller 204 receives the instructions 116 and determines how to load data into the cluster 208. The controller 204 is configured to receive the instructions 116 from the compiler 102, either directly or indirectly. The controller 204 receives data from the memory 206 (or from another source) and causes the data to be loaded into the cluster 208.

The cluster 208 includes the multi-dimensional array of processing units described in relation to FIG. 1. Generally, the cluster 208 thus includes a 2D array, 3D array, etc. of processing units (such as processing unit 214). Each processing unit 214 can be described as a node or a cell, and can include summation circuitry, memory, multiplication circuitry, and so forth (described subsequently in detail in relation to FIG. 4).

The cluster 208 is in communication with a local memory 210. The local memory 210 can be in communication with each of the processing units 214 of the cluster 208. The local memory 210 is configured to store parameters (such as intermediate values) for computations by the cluster 208. In some implementations, each processing unit 214 includes a memory, and so the local memory 210 is distributed among the processing units 210. In some implementations, the local memory 210 includes both a centralized memory accessible by each processing unit 214 and also distributed memory for each processing unit 214 of the cluster 208. The particular configuration that is available is included in the specification 108 and passed to the compiler 102 for generation of the instructions 116.

The loaders 202a, 202b, and 202c are each configured to load data into the processing units 214 of the cluster. The number of loaders 202 and the configuration for loading the data into the cluster 208 are specified in the specification 108. For example, in the example processing device 212 shown, each loader 202 is configured to load data into a row of the cluster 208. In some implementations, the loaders 202 can be configured to load data into columns of the cluster 208, individual processing devices 214 of the cluster 208, or to whole layers of a 3D stack of processing units (or portions thereof). The particular configuration is included in the specification 108 because this can affect how operations are combined by the compiler 102. For example, if a 4×4 array of processing units 214 is available in the cluster 208, the compiler may portion an input matrix into an equivalent size of 4×4 for matrix multiplication (or some other operation). In some implementations, if four torus loops are available in the cluster 208, the compiler 102 can segment a process into four parallel partitions for execution.

Examples of mapping processing loops to physical links of chips (e.g., circuitry comprising one or more processing units) are now described. In some implementations, each of the loaders 202a, 202b, and 202c can be connected to physical torus loops or mesh loops. In the example of a matrix multiplication, the local contributions between the processing units 214 on a cluster 208 are summed. This summing operation is pipelined with the summing operations across peer chips.

In some implementations, bi-directional rings with full-duplex links are used to reduce latency of phases of operations (e.g., a reduce scatter phase and a gather phase) in a rotated pincer algorithm. The bi-directional loop has reduced synchronization and buffering overheads, relative to a unidirectional loop because loop neighbors do not go more than one step ahead of each other. A 1-bit adder can be used to find the target buffer on the downstream neighbor. In contrast, for a unidirectional ring, an explicit flow control packet must be sent by the receiver back to the sender when buffers on the receivers are available to receive packets. The compiler 102 receives a representation of the configuration of the loops in the specification 108.

On torus networks, the bidirectional ring maps directly to the physical links of the torus. Processing units of each chip can be sequentially linked to form the loops for multiple dimensions. This scheme takes advantage of torus links in a torus network. The loops are built along the processing units 214 in a dimension of the torus network. In some implementations, each processing unit includes multiple instances of processing circuitry (e.g., summation circuitry). Within each processing unit, the data shards arrive at one of the instances. Packets are summed and then sent downstream to the peer tensor core on the same processing unit. In the next step, data shards (e.g., data packets) are sent from the second core on a chip node to the first core of the downstream chip.

On mesh networks, intra-processing unit connections can be used to form loops. For example, if each processing unit includes two instances of summation circuitry, a loop can be constructed in the mesh by routing between the instances on each edge of the mesh. The compiler 102 receives the information detailing the specific connections available between processing units 214 of the cluster 208 for use during combining operations.

Figure 3:
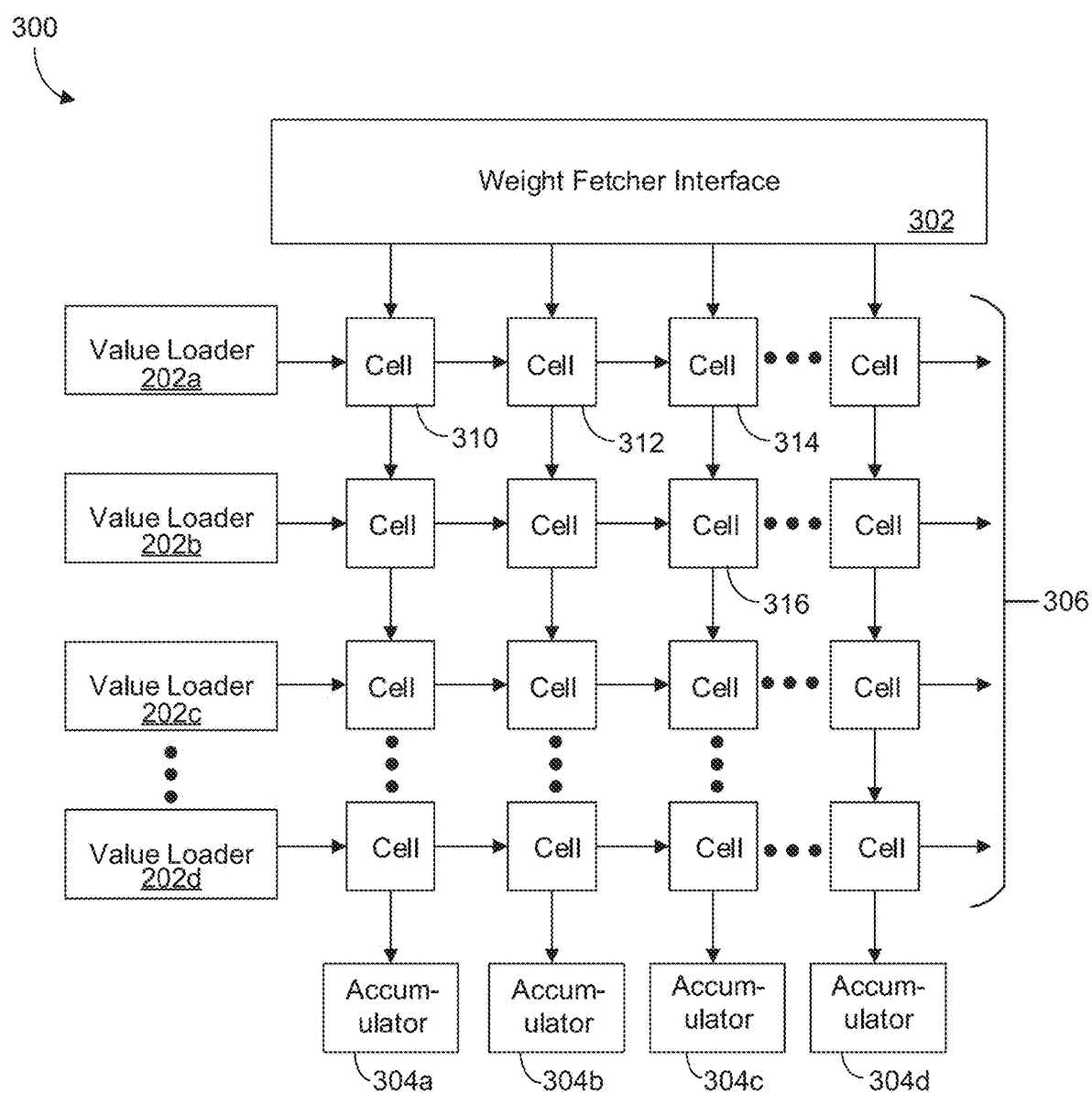
FIG. 3 shows an example of matrix computation circuitry for multiple output fusion in a multi-dimensional array of processing units.

FIG. 3 shows an example of matrix computation circuitry 300 for multiple output fusion in a multi-dimensional array of processing units. The matrix computation circuitry 300 includes a two-dimensional systolic array 306. The array 306 includes multiple cells 310. In some implementations, a first dimension of the array 306 corresponds to columns of cells and a second dimension of the array 306 corresponds to rows of cells. The array 306 can have more rows than columns, more columns than rows, or an equal number of columns and rows.

In the illustrated example, value loaders 202a, 202b, 202c, and 202d send activation inputs to rows of the array 306 and a weight fetcher interface 302 sends weight inputs to columns of the array 306. In some other implementations, however, activation inputs are transferred to the columns and weight inputs are transferred to the rows of the array 306.

The value loaders 202 can receive the activation inputs from a unified buffer. Each value loader 202a, 202b, 202c, and 202d can send a corresponding activation input to a distinct left-most cell of the array 306. The value loader 202a can also send the activation input to an adjacent value loader 202b, and the activation input can be used at another left-most cell of the array 306. This allows activation inputs to be shifted for use in another particular cell of the array 306.

The weight fetcher interface 302 can receive the weight input from a memory unit, e.g., the device memory 206 of FIG. 2. The weight fetcher interface 302 can send a corresponding weight input to a distinct top-most cell of the array 306. Generally, the weights are pre-loaded prior to loading activation inputs into the array 306.

In some implementations, a host interface, e.g., the host interface 302 of FIG. 3, shifts activation inputs throughout the array 306 along one dimension, e.g., to the right, while shifting weight inputs throughout the array 306 along another dimension, e.g., to the bottom. For example, over one clock cycle, the activation input at cell 310 can shift to an activation register in cell 312, which is to the right of cell 310. Similarly, the weight input at cell 314 can shift to a weight register at cell 316, which is below cell 314.

On each clock cycle, each cell can process a given weight input, a given activation input, and an accumulated output from an adjacent cell to generate an accumulated output. The accumulated output can also be passed to the adjacent cell along the same dimension as the given weight input. Each cell may also process a given weight input and a given activation input to generate an output, without processing an accumulated output from an adjacent cell. The output can be passed to adjacent cells along the same dimensions as the given weight input and output without being accumulated, e.g., to perform element-wise multiplication of a set of weights and activation inputs. An individual cell is described further below with reference FIG. 4.

The accumulated output can be passed along the same column as the weight input, e.g., towards the bottom of the column in the array 306. In some implementations, at the bottom of each column, the array 306 can include accumulator units 304a, 304b, 304c, and 304d that store and accumulate each accumulated output from each column when performing calculations with layers having more activation inputs than rows. The accumulator units may have 32-bit integer registers or buffers that store outputs of the cells. In some implementations, each accumulator unit stores multiple parallel accumulations. The accumulator units 304a-d can accumulate each accumulated output to generate a final accumulated value.

The compiler 102 can receive data in the specification indicative of the array 306 configuration for matrix multiplication. For example, the compiler 102 can receive data indicating the size of the array 306, how many clock cycles the array requires to multiply matrices, and the amount of storage available on the chip including the array 306 for storing intermediate results. In some implementations, the compiler 102 receives the data indicating characteristics of the output vector of the accumulators. The compiler 102 can use this data to determine an optimal distribution of tasks among the multi-dimensional array of processing units to shorten the processing time of the data being received.

Figure 4:
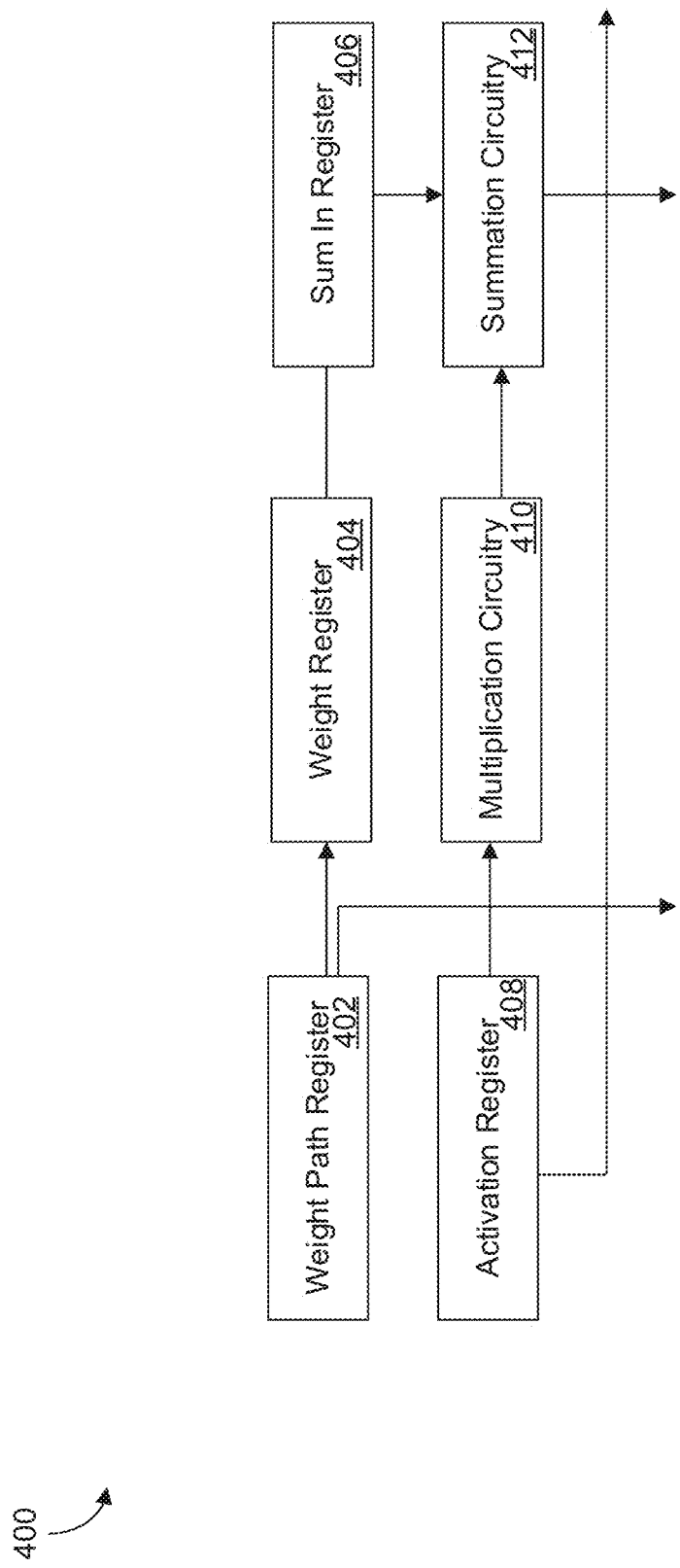
FIG. 4 shows an example architecture of a cell inside the matrix computation circuitry of FIG. 3.

FIG. 4 shows an example architecture of a cell 400 inside the matrix computation circuitry of FIG. 3. The cell 400 can include an activation register 408 that stores an activation input. The activation register can receive the activation input from a left adjacent cell, i.e., an adjacent cell located to the left of the given cell, or from a unified buffer, depending on the position of the cell within the systolic array. The cell can include a weight register 404 that stores a weight input. The weight input can be transferred from a top adjacent cell or from a weight fetcher interface, depending on the position of the cell within the systolic array. The cell can also include a sum in register 406. The sum in register 406 can store an accumulated value from the top adjacent cell. Multiplication circuitry 410 can be used to multiply the weight input from the weight register 404 with the activation input from the activation register 408. The multiplication circuitry 410 can output the product to summation circuitry 412.

The summation circuitry 412 can sum the product and the accumulated value from the sum in register 406 to generate a new accumulated value. The summation circuitry 412 can then send the new accumulated value to another sum in register located in a bottom adjacent cell. The new accumulated value can be used as an operand for a summation in the bottom adjacent cell.

The summation circuitry 412 can also accept a value from the sum in register 406 and send the value from the sum in register 406 to a bottom adjacent cell without summing the value from the sum in register 406 with the product from the multiplication circuitry 410. For example, to perform element-wise multiplication, a cell may receive a value at the sum in register 406 and the received value may be output to an adjacent cell, i.e., without the summation circuitry 412 adding the product to the received value. The cell may also provide the product produced by the multiplication circuitry 410, corresponding to an element-wise multiplication by the cell, to an adjacent cell without summing the product and a value received at the sum in register 406. The result is that the array 306 can provide output vectors corresponding to element-wise multiplication of activation inputs and weights.

The cell can also shift the weight input and the activation input to adjacent cells for processing. For example, the weight register 404 can send the weight input to another weight register in the bottom adjacent cell. The activation register 408 can send the activation input to another activation register in the right adjacent cell. Both the weight input and the activation input can therefore be reused by other cells in the array at a subsequent clock cycle.

In some implementations, the cell also includes a control register. The control register can store a control signal that determines whether the cell should shift either the weight input or the activation input to adjacent cells. In some implementations, shifting the weight input or the activation input takes one or more clock cycles. The control signal can also determine whether the activation input or weight inputs are transferred to the multiplication circuitry 410, or can determine whether the multiplication circuitry 410 operates on the activation and weight inputs. The control signal can also be passed to one or more adjacent cells, e.g., using a wire.

In some implementations, weights are pre-shifted into a weight path register 402. The weight path register 402 can receive the weight input, e.g., from a top adjacent cell, and transfer the weight input to the weight register 404 based on the control signal. The weight register 404 can statically store the weight input such that as activation inputs are transferred to the cell, e.g., through the activation register 408, over multiple clock cycles, the weight input remains within the cell and is not transferred to an adjacent cell. Therefore, the weight input can be applied to multiple activation inputs, e.g., using the multiplication circuitry 410, and respective accumulated values can be transferred to an adjacent cell.

The cell 400 can be processing unit of the multi-dimensional array of processing units of FIG. 1. In some implementations, the cell 400 forms a portion of a processing unit, and the processing unit can include additional memory, logic circuitry, and so forth for processing and/or storing data.

Generally, the compiler 102 does not necessarily analyze the particular hardware configuration of each processing unit when combining operations of the intermediate representation 104. However, properties of the cell 400 that affect computation timing and throughput can be included in the specification 108 for analysis by the compiler 102.

Figure 5A:
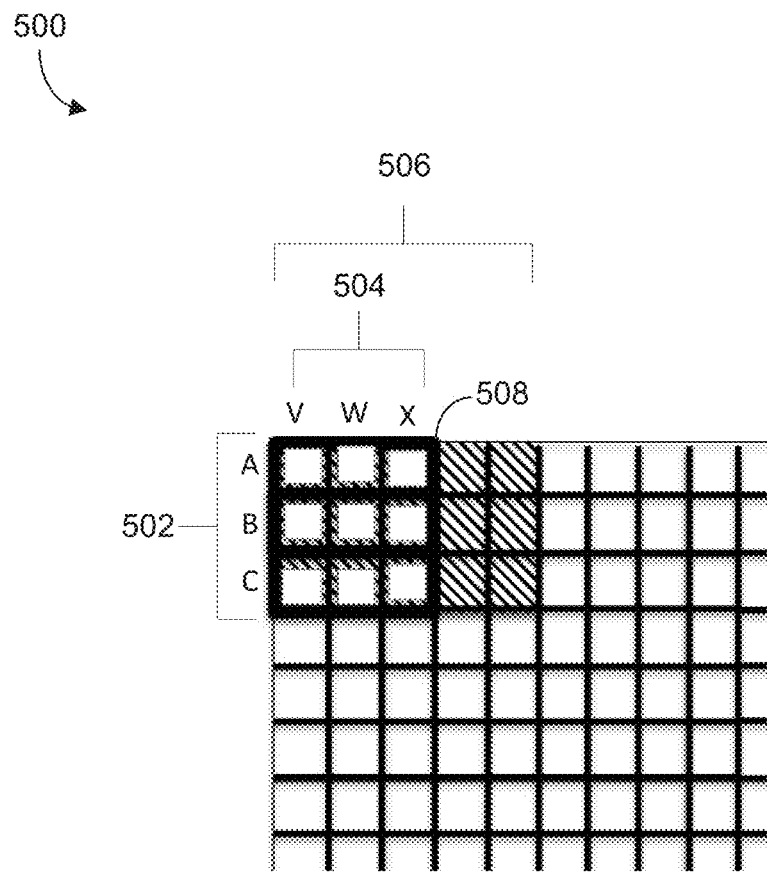
FIGS. 5A-5C show examples of executing operations by the matrix computation circuitry of FIGS. 3-4.
Figure 5B:
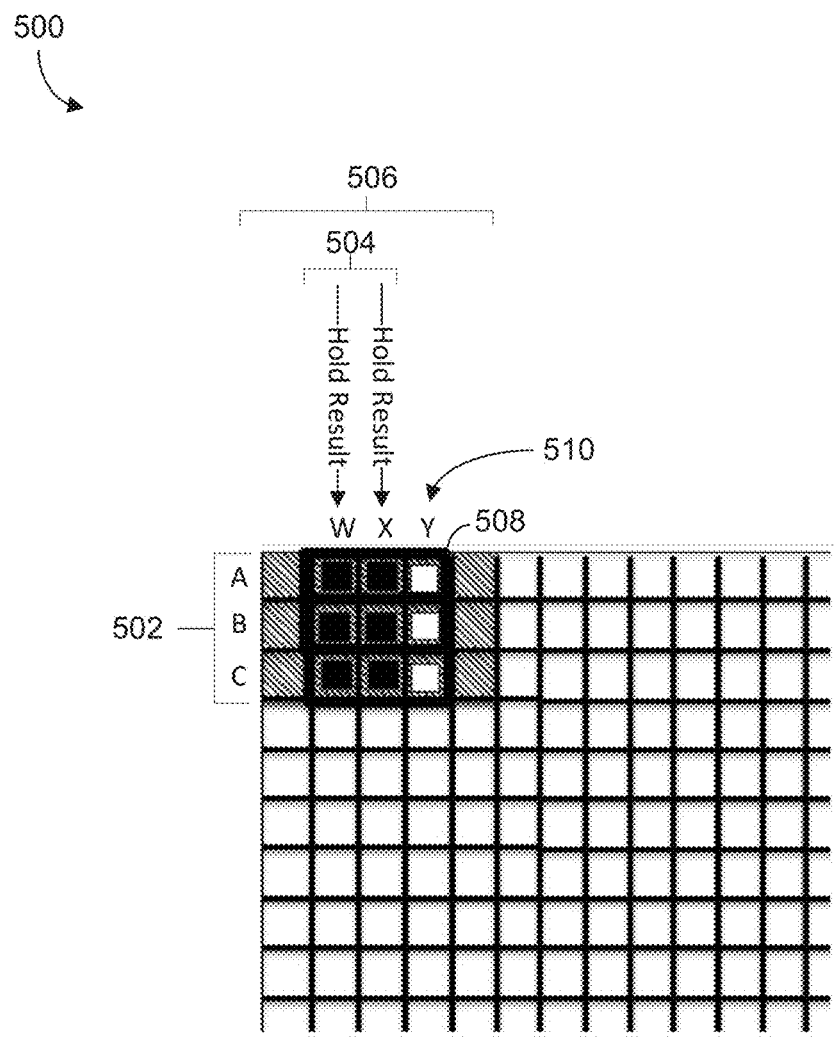
Figure 5C:
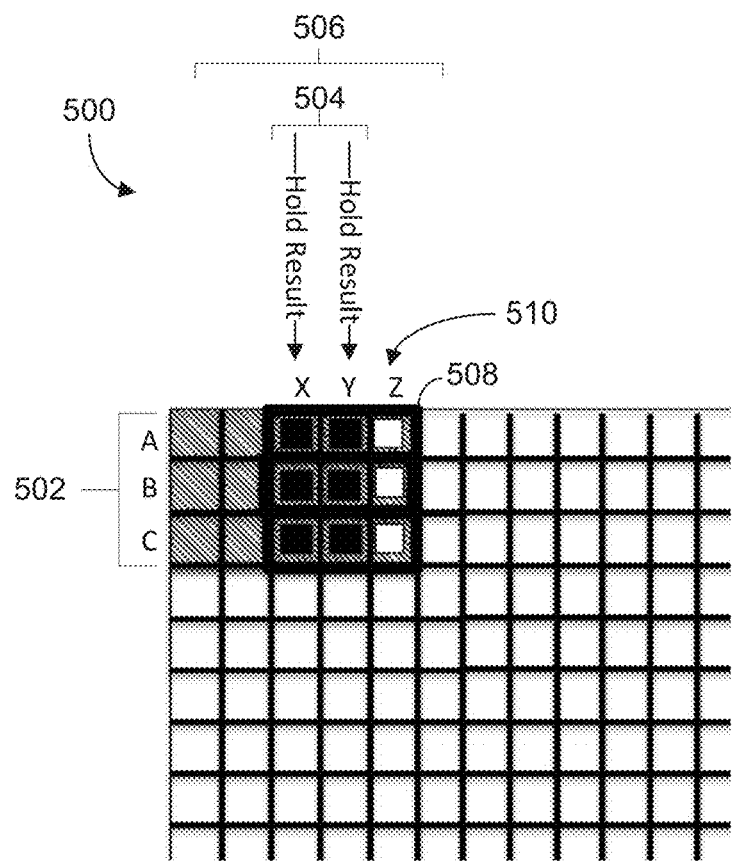

FIGS. 5A-5C show examples of executing operations by the matrix computation circuitry of FIGS. 3-4. FIGS. 5A-5C illustrate at a high level steps of a convolution operation for a matrix 500 of values. FIG. 5A depicts an embodiment of matrix data (e.g., an input frame of image data). The image data 500 has rows 502 including rows A, B, and C, and columns 504, including columns V, W, and X. A portion 506 of the image data 500 is shaded. The portion 506 is being considered by a processing unit for the convolution operation in this example.

A filter 508 (having a dimension of 3 pixels×3 pixels) is being applied to the image data for the convolution operation. The processing unit operates using element-wise multiplication over the region 506 with the filter 508. Note that filter values are not shown. The output result from the matrix multiplication and summation is generated for a region of the image is highlighted in solid black. This filter represents a sliding window over the image data for element-wise multiplication and summation.

Typically, to perform such an operation, portions (such as portion 506) of the data are streamed into vector memory over time. The portion is loaded out of vector memory into a vector register. In this case, pieces of these data are loaded out of vector memory and into vector registers. The kernel values for the filter and bias values are separately loaded. Once the bias and image data are added, the kernel values are latched into memory of the processing unit. A matrix multiplication is performed with the biased-added portion of the input generate an output value. In FIG. 5A, the values of the bias-added input are shown as white boxes. When the filter is applied, an output can be shown as a black box (e.g., in FIGS. 5B and 5C). The output values are portions of the convolution output that can be referred to as intermediate results. These values can be stored in memory of the processing unit rather than being recomputed for each convolution output value during the matrix multiplication and summation.

Turning to FIG. 5B, as the filter 508 slides rightward one column (to column Y), values for columns W and X can be held for applying the filter to the updated region. Thus, the intermediate results for columns W and X are already available for further matrix multiplication of the filter and the image data. The additional intermediate values 510 for column Y can be computed by using the stored intermediate values 504 of columns W and X.

Similarly, turning to FIG. 5C, the stored intermediate values of columns X and Y are stored, and the additional intermediate values 510 of column 510 are computed. The compiler 102 configures the instructions 116 to cause the multi-dimensional array of processing units to perform the convolution of FIGS. 5A-5C this way because the compiler 102 has data from the specification 108 indicating that such an optimization is possible. For example, the specification 108 indicates that the vector registers for the multi-dimensional array of processing units are available to store the intermediate results for the columns of the image data. The compiler 102 thus can instruct the intermediate values to be stored and combine steps of the matrix multiplication and summation for the convolution operation, reducing processing time.

Figure 6:
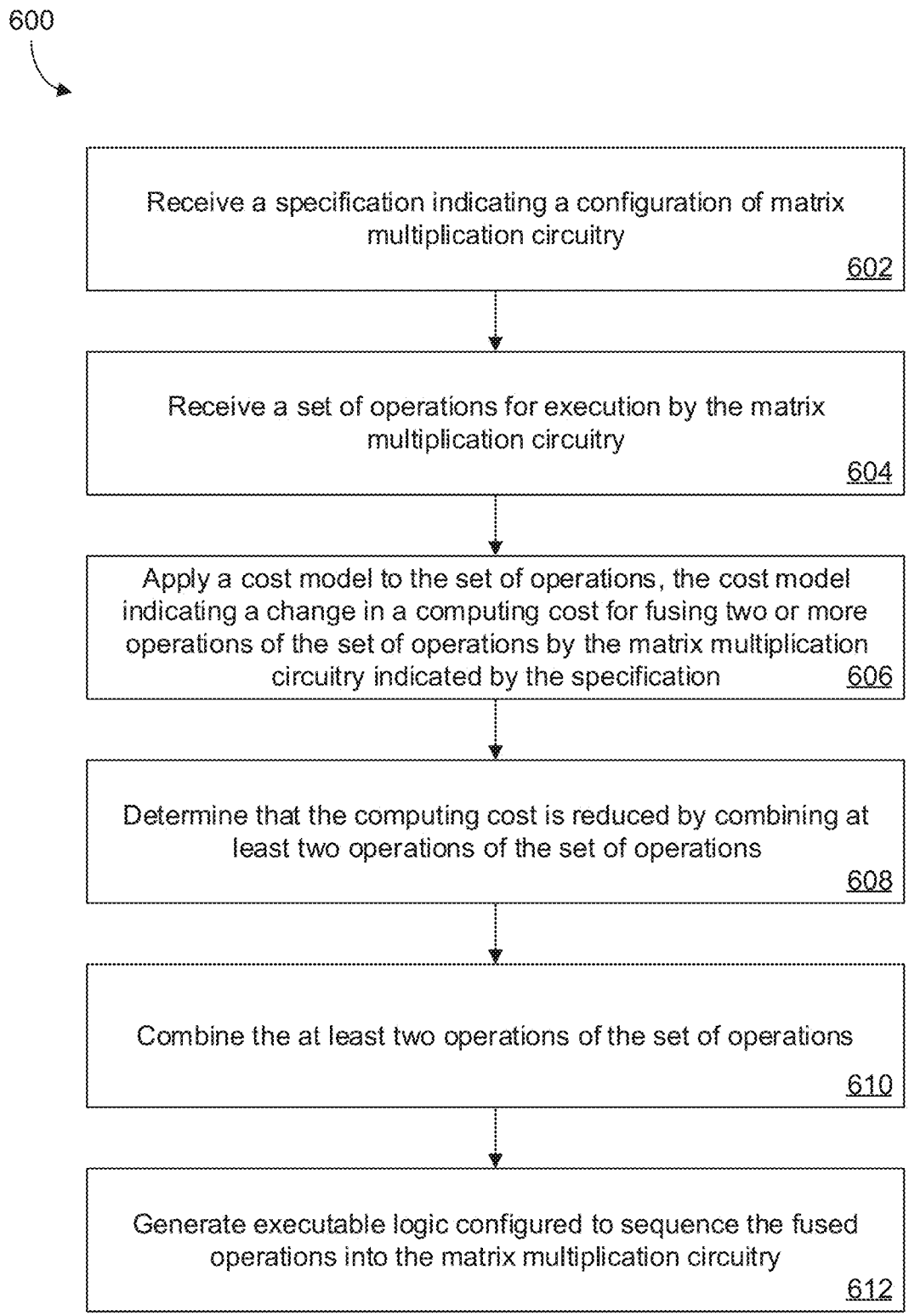
FIG. 6 is a flow diagram showing operations for multiple output fusion (MOF) in multiple dimensions.

FIG. 6 is a flow diagram showing a process 600 for multiple output fusion (MOF) in multiple dimensions. The process 600 includes receiving (602) a specification indicating a configuration of matrix multiplication circuitry being implemented as a multi-dimensional array of processing units. The process 600 includes receiving (604) a set of operations for execution by the matrix multiplication circuitry. The process includes applying (606), based on the specification, a cost model to the set of operations, the cost model indicating a change in a computing cost for fusing two or more operations of the set of operations by the matrix multiplication circuitry indicated by the specification. The process includes determining (608), based on the applying, that the computing cost is reduced by fusing at least two operations of the set of operations when the fused operations are executed by the matrix multiplication circuitry. The process 600 includes fusing (610) the at least two operations of the set of operations. The process 600 includes generating (612) executable logic configured to sequence the fused operations into the matrix multiplication circuitry.

In some implementations, the process 600 includes identifying data that is to be processed repeatedly in the matrix multiplication circuitry as indicated by an operation of the set of operations to repeatedly generate a result. The process 600 can include determining, from the specification, that the cache of a processing device is configured to store the result of a first iteration of the operation and that the processing device is configured to cause the result to be retrieved in the matrix multiplication circuitry for subsequent iterations of the operation. The process 600 can include generating an instruction causing the processing device to store the result of the operation in the cache and retrieve the stored result in the matrix multiplication circuitry.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing unit" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To send for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can send input to the computer. Other kinds of devices can be used to send for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

While this specification contains many specific implementation details, these should not be construed as limitations on the scope of any invention or on the scope of what may be claimed, but rather as descriptions of features that may be specific to particular embodiments of particular inventions. In this specification, the terms "vector," "vector data," and "vector elements" are used broadly to refer to any non-scalar data. In addition to vectors examples of non-scalar data are strings, arrays, structs, matrices, and tensors.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method, comprising:
   receiving a specification indicating a configuration of matrix multiplication circuitry being implemented as a multi-dimensional array of processing units that has dimensions that specify a respective number of processing units along each of multiple dimensions of the multi-dimensional array;
   receiving a set of operations for execution by the matrix multiplication circuitry;
   based on the specification, applying a cost model to the set of operations, the cost model indicating a change in a computing cost for fusing two or more operations of the set of operations by the matrix multiplication circuitry indicated by the specification, wherein the cost model evaluates the change in the computing cost based on the respective numbers of processing units along each of multiple dimensions of the multi-dimensional array;
   determining, based on the applying, that the computing cost is reduced by fusing at least two operations of the set of operations when the fused operations are executed by the matrix multiplication circuitry;
   fusing the at least two operations of the set of operations; and
   generating executable logic configured to sequence the fused operations into the matrix multiplication circuitry.

2. The computer-implemented method of claim 1, wherein the specification indicates that each processing unit of the matrix multiplication circuitry comprises a cache configured to store at least a portion of a result of a fused operation and an arithmetic processing unit (ALU) configured to operate on the portion of the result.

3. The computer-implemented method of claim 2, wherein applying the cost model to the set of operations based on the specification comprises:
   identifying data that is to be processed repeatedly in the matrix multiplication circuitry as indicated by an operation of the set of operations to repeatedly generate a result;
   determining, from the specification, that the cache of a processing device is configured to store the result of a first iteration of the operation and that the processing device is configured to cause the result to be retrieved in the matrix multiplication circuitry for subsequent iterations of the operation; and
   generating an instruction causing the processing device to store the result of the operation in the cache and retrieve the stored result in the matrix multiplication circuitry.

4. The computer-implemented method of claim 1, wherein the specification includes direct memory access (DMA) parameters for the matrix multiplication circuitry.

5. The computer-implemented method of claim 1, wherein an operation of the set of operations includes a convolution operation, and wherein fusing at least two operations comprises causing one or more processors of the matrix multiplication circuitry to latch data representing kernel values for the convolution operation.

6. The computer-implemented method of claim 1, wherein fusing the operations comprises concatenation of two tensors by multi-dimensional broadcasting.

7. The computer-implemented method of claim 1, wherein the set of operations is represented as a graph in the cost model, the graph comprising one or more optimization pathways.

8. The computer-implemented method of claim 1, wherein generating executable logic comprises just-in-time compiling.

9. The computer-implemented method of claim 1, wherein processing units of the matrix multiplication circuitry are arranged to form a systolic array.

10. One or more non-transitory computer readable media storing instructions that are executable by one or more processors configured to perform operations comprising:
    receiving a specification indicating a configuration of matrix multiplication circuitry being implemented as a multi-dimensional array of processing units that has dimensions that specify a respective number of processing units along each of multiple dimensions of the multi-dimensional array;
    receiving a set of operations for execution by the matrix multiplication circuitry;
    based on the specification, applying a cost model to the set of operations, the cost model indicating a change in a computing cost for fusing two or more operations of the set of operations by the matrix multiplication circuitry indicated by the specification, wherein the cost model evaluates the change in the computing cost based on the respective numbers of processing units along each of multiple dimensions of the multi-dimensional array;
    determining, based on the applying, that the computing cost is reduced by fusing at least two operations of the set of operations when the fused operations are executed by the matrix multiplication circuitry;
    fusing the at least two operations of the set of operations; and
    generating executable logic configured to sequence the fused operations into the matrix multiplication circuitry.

11. The one or more non-transitory computer readable media of claim 10, wherein the specification indicates that each processing unit of the matrix multiplication circuitry comprises a cache configured to store at least a portion of a result of a fused operation and an arithmetic processing unit (ALU) configured to operate on the portion of the result.

12. The one or more non-transitory computer readable media of claim 11, wherein applying the cost model to the set of operations based on the specification comprises:
    identifying data that is to be processed repeatedly in the matrix multiplication circuitry as indicated by an operation of the set of operations to repeatedly generate a result;
    determining, from the specification, that the cache of a processing device is configured to store the result of a first iteration of the operation and that the processing device is configured to cause the result to be retrieved in the matrix multiplication circuitry for subsequent iterations of the operation; and
    generating an instruction causing the processing device to store the result of the operation in the cache and retrieve the stored result in the matrix multiplication circuitry.

13. The one or more non-transitory computer readable media of claim 10, wherein the specification includes direct memory access (DMA) parameters for the matrix multiplication circuitry.

14. The one or more non-transitory computer readable media of claim 10, wherein an operation of the set of operations includes a convolution operation, and wherein fusing at least two operations comprises causing one or more processors of the matrix multiplication circuitry to latch data representing kernel values for the convolution operation.

15. The one or more non-transitory computer readable media of claim 10, wherein fusing the operations comprises concatenation of two tensors by multi-dimensional broadcasting.

16. The one or more non-transitory computer readable media of claim 11, wherein the set of operations is represented as a graph in the cost model, the graph comprising one or more optimization pathways.

17. The one or more non-transitory computer readable media of claim 10, wherein generating executable logic comprises just-in-time compiling.

18. The one or more non-transitory computer readable media of claim 10, wherein processing units of the matrix multiplication circuitry are arranged to form a systolic array.

19. A system comprising one or more computers and one or more storage devices storing instructions that when executed by the one or more computers cause the one or more computers to perform operations comprising:

receiving a specification indicating a configuration of matrix multiplication circuitry being implemented as a multi-dimensional array of processing units that has dimensions that specify a respective number of processing units along each of multiple dimensions of the multi-dimensional array;

receiving a set of operations for execution by the matrix multiplication circuitry;

based on the specification, applying a cost model to the set of operations, the cost model indicating a change in a computing cost for fusing two or more operations of the set of operations by the matrix multiplication circuitry indicated by the specification, wherein the cost model evaluates the change in the computing cost based on the respective numbers of processing units along each of multiple dimensions of the multi-dimensional array;

determining, based on the applying, that the computing cost is reduced by fusing at least two operations of the set of operations when the fused operations are executed by the matrix multiplication circuitry;

fusing the at least two operations of the set of operations; and generating executable logic configured to sequence the fused operations into the matrix multiplication circuitry.

20. The system of claim 19, wherein the specification indicates that each processing unit of the matrix multiplication circuitry comprises a cache configured to store at least a portion of a result of a fused operation and an arithmetic processing unit (ALU) configured to operate on the portion of the result.

* * * * *